(12) United States Patent
Vineyard, Jr. et al.

(10) Patent No.: US 7,533,350 B2
(45) Date of Patent: *May 12, 2009

(54) MULTIPLE OPERATING SYSTEM QUICK BOOT UTILITY

(75) Inventors: James L. Vineyard, Jr., Meridan, ID (US); James A. McKeeth, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 673 days.

This patent is subject to a terminal disclaimer.

(21) Appl. No.: 10/808,221

(22) Filed: Mar. 23, 2004

(65) Prior Publication Data

US 2004/0210848 A1   Oct. 21, 2004

Related U.S. Application Data

(63) Continuation of application No. 09/266,325, filed on Mar. 11, 1999, now Pat. No. 6,727,920.

(51) Int. Cl.
*G06F 3/048* (2006.01)

(52) U.S. Cl. .................................. 715/771; 715/810

(58) Field of Classification Search ................ 715/810, 715/835, 771, 846, 839
See application file for complete search history.

(56) References Cited

U.S. PATENT DOCUMENTS

| 4,675,814 | A |   | 6/1987  | Murai et al. ............... 717/11  |
| 5,134,580 | A | * | 7/1992  | Bertram et al. ............. 713/1   |
| 5,136,711 | A |   | 8/1992  | Hugard et al. ............ 395/700   |
| 5,367,661 | A |   | 11/1994 | Hough et al. ............. 395/500   |
| 5,428,792 | A |   | 6/1995  | Conner ..................... 395/700  |
| 5,504,904 | A |   | 4/1996  | Dayan et al. ............. 395/700   |
| 5,562,523 | A |   | 10/1996 | Asano et al. ................. 451/1 |
| 5,617,560 | A |   | 4/1997  | Ichikawa .................. 395/500  |
| 5,671,366 | A |   | 9/1997  | Niwa et al. ............... 710/101  |
| 5,684,952 | A |   | 11/1997 | Stein ........................ 709/221|
| 5,689,701 | A |   | 11/1997 | Ault et al. ................ 395/610 |
| 5,692,143 | A |   | 11/1997 | Johnson et al. ........... 345/339   |
| 5,715,458 | A |   | 2/1998  | Holder et al. ............ 395/680   |

(Continued)

OTHER PUBLICATIONS

Micron Electronics, Inc.—Assignee, U.S. Appl. No. 09/201,097, filed Nov. 30, 1998, "OS Multi Boot Integrator."

(Continued)

*Primary Examiner*—Kieu D Vu
(74) *Attorney, Agent, or Firm*—Knobbe, Martens, Olson & Bear, LLP

(57) ABSTRACT

A computerized user interface for assisting a computer user selects a default operating system for a computer. The computerized interface operates during a current computing session and provides a list of operating systems available. A user can make a selection using standard activatible controls such as icons, alphanumeric lists and highlighting. Once selected, an operating becomes the default operating system software on the computer. Therefore, during the next startup of the computer a selected operating system will boot unless there is some other intervention. In addition to selecting an operating system, this invention can also be used to cause the computer to restart. Restart can be set to execute immediately or to execute upon a change in the default operating system. In addition this invention can be caused to uninstall thereby erasing the program files relating to this invention.

15 Claims, 5 Drawing Sheets

U.S. PATENT DOCUMENTS

| | | | |
|---|---|---|---|
| 5,887,163 A | 3/1999 | Nguyen et al. | 395/652 |
| 5,966,540 A | 10/1999 | Lister et al. | 717/11 |
| 6,031,527 A | 2/2000 | Shoji et al. | 345/333 |
| 6,032,239 A | 2/2000 | Beelitz | 711/173 |
| 6,076,734 A | 6/2000 | Dougherty | 235/462.01 |
| 6,202,206 B1 | 3/2001 | Dean et al. | 717/11 |

OTHER PUBLICATIONS

Micron Electronics, Inc.—Assignee, U.S. Appl. No. 09/201,911, filed Nov. 30, 1998, "OS Multi Boot Integrator."

* cited by examiner

MULTIPLE OPERATING SYSTEM QUICK BOOT UTILITY

RELATED APPLICATIONS

The present application is a continuation of U.S. patent application Ser. No. 09/266,325, filed on Mar. 11, 1999, now U.S. Pat. No. 6,727,920 which is hereby incorporated by reference in its entirety.

BACKGROUND

The present invention relates to computer software utility programs, and more specifically, to a software program designed to simplify a choice of operating systems to load upon reboot of a computer.

In a computing environment that takes advantage of more than one operating system, the choice of which operating system will load into a computer upon startup has traditionally been determined by a user during the computer startup sequence. Typically, a user waits for a load utility to present a menu during a startup routine. A load utility menu will present a list of available operating systems. A user can select a desired operating system to load during an imminent computing session. Most load utility menus are designed such that the ability to choose an operating system is only available for some window of time. If no intervening action is taken during that window of time, the computer reverts to a default operating system and proceeds with the boot sequence.

During a computing session if it is required that a different operating system be utilized, the computer must be rebooted and a selection must be made from the menu during the computer startup sequence. Rebooting of a computer can be a lengthy process, often lasting several minutes. A user needs to be attentive during a typical reboot procedure and make a timely choice from a menu designating operating systems. A window of time allotted a user during which the user has the opportunity to designate a choice of operating systems may only last seconds. A user that is not attentive may let this window of time pass, wherein a computer will continue to boot using a default operating system. If the default operating system is not the system of choice for the user, the user will need to wait until the default operating system finishes loading and then shut it down, starting the sequence over again. It would be useful to have a means of designating from a current computing session an operating system to load upon the next computer start sequence.

Every general purpose computer must have an operating system to run application programs. An operating system performs basic tasks such as recognizing input from a keyboard, sending output to a display screen, keeping track of files and directories on a disk and controlling peripheral devices such as disk drives and printers. FIG. 1. In addition, all operating systems make sure that different programs running at the same time do not interfere with each other and provide for security against unauthorized users.

Application programs run on an operating system, therefore, an application program must be written to run on a particular operating system. A user's choice of operating system is often determined by the applications that will be run. Popular operating systems for computers include DOS, Windows™, Windows 95™, Windows NT™, OS/2™, and Linux. Advanced users may wish to have Windows NT™, OS/2™ and Linux on the same machine. Technicians and support type personnel who wish to emulate different operating environments of various users can also find multiple operating systems useful. In addition, developers may need several versions of the same operating system available. With enough disk space, it is possible to have multiple operating systems on one machine.

During typical start up of a computer, the first program to execute is the power on self-test program or POST. Following POST, a basic input output system or BIOS runs. Amongst other things, BIOS is responsible for directing a computer to a boot sector of a disk on which an operating system is installed. Having identified a correct disk and sector, Read Only Memory (ROM) that holds the BIOS initializes code to read the first record from that disk into storage. The first record is referred to as a master boot record or MBR. Computer hard drives can be partitioned such that each partition can potentially hold a different operating system. A MBR will look to the partition table and choose a primary partition that is marked active or startable. The MBR program can read the first 512 byte sector from the active primary partition. This first sector commonly comprises an operating system loader program.

When utilizing multiple operating systems, it is sometimes preferable to have the MBR boot load a loader utility. A loader utility can specify information about logical partitions and locate operating systems stored on them. One example of a loader utility is Boot Manager. Boot Manager is part of the OS/2™ operating system. Boot Manager is not a full operating system; it is only a utility to direct a computer towards a full operating system. To run an operating system, Boot Manager is directed to the first sector of a designated partition or volume and runs a program contained there.

A BIOS initialization code locates a first 512 byte record of a first disk drive and reads code on it comprising a MBR. The MBR then reads a first sector of an active partition and executes code contained on the active partition. If the active partition is a load utility, the boot manager directs the computer to a first sector of a partition or logical volume containing code comprising a chosen operating system. An operating system may be chosen by operator selection or as a default of the boot manager.

A computer with multiple operating systems can utilize a hard drive with multiple partitions. Each partition may belong to a different file system. Generally, an operating system will ignore those partitions whose ID type represents an unknown file system type. A load utility is typically installed in its own non-DOS, 1 megabyte, primary partition on the first hard drive. In this way, ROM or BIOS initialization code first accesses the master boot record. The master boot record sees that a load utility partition is active and loads that program into memory. The load utility presents a menu on a display giving a user an opportunity to make a selection from available operating systems. A computer boots to a default system if there is no response from a user within a window of time comprising a time out period.

In a similar fashion, Windows NT™ uses a utility called the NT loader. With Windows NT™, the NT boot sector loads a hidden program. The hidden program displays a boot selection menu based on information in a plain text data set, such as a boot.ini file. Typical to a load utility, NT loader gives a user a specified time out period to select an option from the menu. If nothing is entered, Windows NT™ is loaded by default.

Typically, a boot sector manager will reference a boot.ini file. Amongst other information the boot.ini file can contain a list of different operating systems available to the computer upon boot up. In addition a boot.ini can store information such as how many seconds a menu for user selection of the operating system is made available to a user before a default operating system loads.

Operating system product vendors sometimes support rebooting into a different interface of their own proprietary operating systems from a current computing session. For instance, Microsoft Windows 95™ includes the capability of rebooting into a DOS interface. It would be useful for a utility to be available from a standard operating system interface that allows for selection of an operating system to load upon reboot of a computer. Such a utility would provide a customizable, user friendly, operating system selection interface. In order to be most useful such an interface should be simple enough so as not to require explanation on how to implement a change in operating system software.

SUMMARY OF THE INVENTION

Accordingly, the present invention provides a method and apparatus for specifying an operating system of choice during a current computing session such that upon reboot, a computer will boot up into a specified operating system. Generally, a computerized user interface 400 is provided to assist a user in the selection of a software operating system to be used on a computer. A selected operating system is set to load by default upon the next start up of the computer. Computer executable program code, i.e. software, running on a computer directs the computer to perform desired functions relating to selection and loading of an operating system on a computer. This invention also comprises a computer readable medium onto which program code for implementing in the computer desired function ability has been stored.

Computer software running on a computer causes a user interface 400 to present to a user a list of available operating systems for the computer. This computerized user interface 400 allows a user to select a desired operating system via a user activatible control. User activatible controls include, for example, clicking on an icon, cursoring to a selection until it is highlighted, selecting an alphanumeric designation corresponding with a desired operating system, typing out the selection or other known activatible control mechanisms for making a selection from a display. An operating system correlating with the selection made by the user is made to load upon restarting of the computer.

Providing an interface for other options related to the selection of an operating system also comprise this invention. Other options that can be made a part of the interface include causing an immediate restart or reboot of the computer with a change in default operating system, restarting the computer in response to an activatible control, specifying a time out period during which a user can override a default operating system, installation of the program code, uninstalling the program code, or reinstalling the program code.

DETAILED DESCRIPTION OF THE INVENTION

Figure 1:
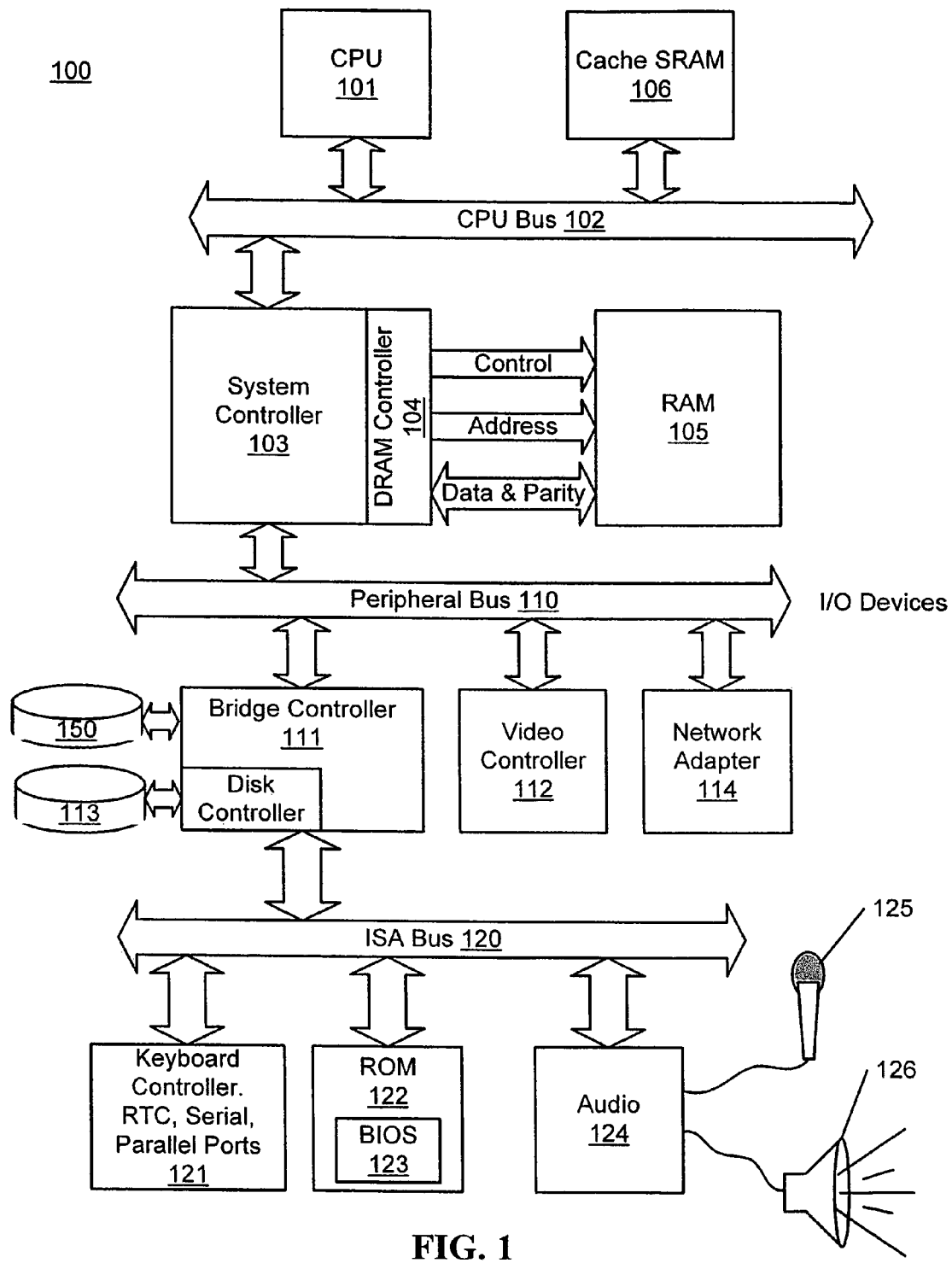
FIG. 1 is a computer hardware diagram.

Referring to FIG. 1, physical resources of a computer system 100 are depicted. The computer 100 has a central processor 101 connected to a processor host bus 102 over which it provides data, address and control signals. The processors 101 may be any conventional general purpose single- or multi-chip microprocessor such as a Pentium® processor, a Pentium® Pro processor, a Pentium II® processor, a MIPS® processor, a Power PC® processor or an ALPHA® processor. In addition, the processor 101 may be any conventional special purpose microprocessor such as a digital signal processor or a graphics processor. The microprocessor 101 has conventional address, data, and control lines coupling it to a processor host bus 102.

The computer 100 includes a system controller 103 having an integrated RAM memory controller 104. The system controller 103 is connected to the host bus 102 and provides an interface to random access memory 105. The system controller 103 also provides host bus to peripheral bus bridging functions. The controller 103 thereby permits signals on the processor host bus 102 to be compatibly exchanged with signals on a primary peripheral bus 110. The peripheral bus 110 may be, for example, a Peripheral Component Interconnect (PCI) bus, an Industry Standard Architecture (ISA) bus, or a Micro-Channel bus. Additionally, the controller 103 can provide data buffering and data transfer rate matching between the host bus 102 and peripheral bus 110. The controller 103 thereby allows, for example, a processor 101 having a 64-bit 66 MHz interface and a 533 Mbytes/second data transfer rate to interface to a PCI bus 110 having a data path differing in data path bit width, clock speed, or data transfer rate.

Accessory devices including, for example, a video display controller 112 and network controller 114 can be coupled to the peripheral bus 110. The network controller 114 may be a modem, an Ethernet networking card, a cable modem, or other network access device. The system 100 may also include a secondary peripheral bus 120 coupled to the primary peripheral bus 110 through a bridge controller 111. The secondary peripheral bus 120 can be included in the system 100 to provide additional peripheral device connection points or to connect peripheral devices that are not compatible with the primary peripheral bus 110. For example, in the system 100, the secondary bus 120 may be an ISA bus and the primary bus 110 may be a PCI bus. Such a configuration allows ISA devices to be coupled to the ISA bus 120 and PCI devices to be coupled to the PCI bus 110. The bridge controller 111 can also include a hard disk drive control interface to couple a hard disk 113 to the peripheral bus 110.

The computer 100 also includes non-volatile ROM memory 122 to store basic computer software routines. ROM 122 may include alterable memory, such as EEPROM (Electronically Erasable Programmable Read Only Memory), to store configuration data. For example, EEPROM memory may be used to store hard disk 113 geometry and configuration data. BIOS routines 123 are included in ROM 122 and provide basic computer initialization, systems testing, and input/output (I/O) services. For example, BIOS routines 123 may be executed by the processor 101 to process interrupts that occur when the bridge 111 attempts to transfer data from the ISA bus 120 to the host bus 102 via the bridge 111, peripheral bus 110, and system controller 103. The BIOS 123 also includes routines that allow an operating system to be "booted" from the disk 113 or from a server computer using a local area network connection provided by the network adapter 114. An operating system 252 boot operation can occur after computer 100 is turned on and power-on self-test (POST) routines stored in the BIOS 123 complete execution, or when a reset switch is depressed, or following a software-initiated system reset or a software fault. During the boot process, the processor 101 executes BIOS 123 software to access the disk controller 111 or network controller 114 and thereby obtain a high-level operating system. Examples of high-level operating systems are, the Microsoft Disk Operating System (DOS)™, Windows 95™, Windows NT™, a UNIX operating system, the Apple MacOS™ operating system, or other operating system.

An operating system may be fully loaded in the RAM memory 105 or may include portions in RAM memory 105, disk drive storage 113, or storage at a network location. For example, the Microsoft Windows 95™ operating system includes some functionality that remains in memory 105 during the use of Windows 95™ and other functionality that is periodically loaded into RAM memory 105 on an as-needed basis from, for example, the disk 113. An operating system, such as Windows 95™ or Windows NT™ provides functionality to control computer peripherals such as devices 310, 320, 330, 350, 360, 370, and 113, and to execute user applications. User applications may be commercially available software programs such as a word processor, spreadsheet, database, client software, computer aided drawing and manufacturing software, scientific software, internet access software and many other types of software. User applications may access computer system peripheral controllers 112-114, 121, and 124 through an application programming interface provided by the operating system and/or may directly interact with underlying computer system 100 hardware.

Figure 2:
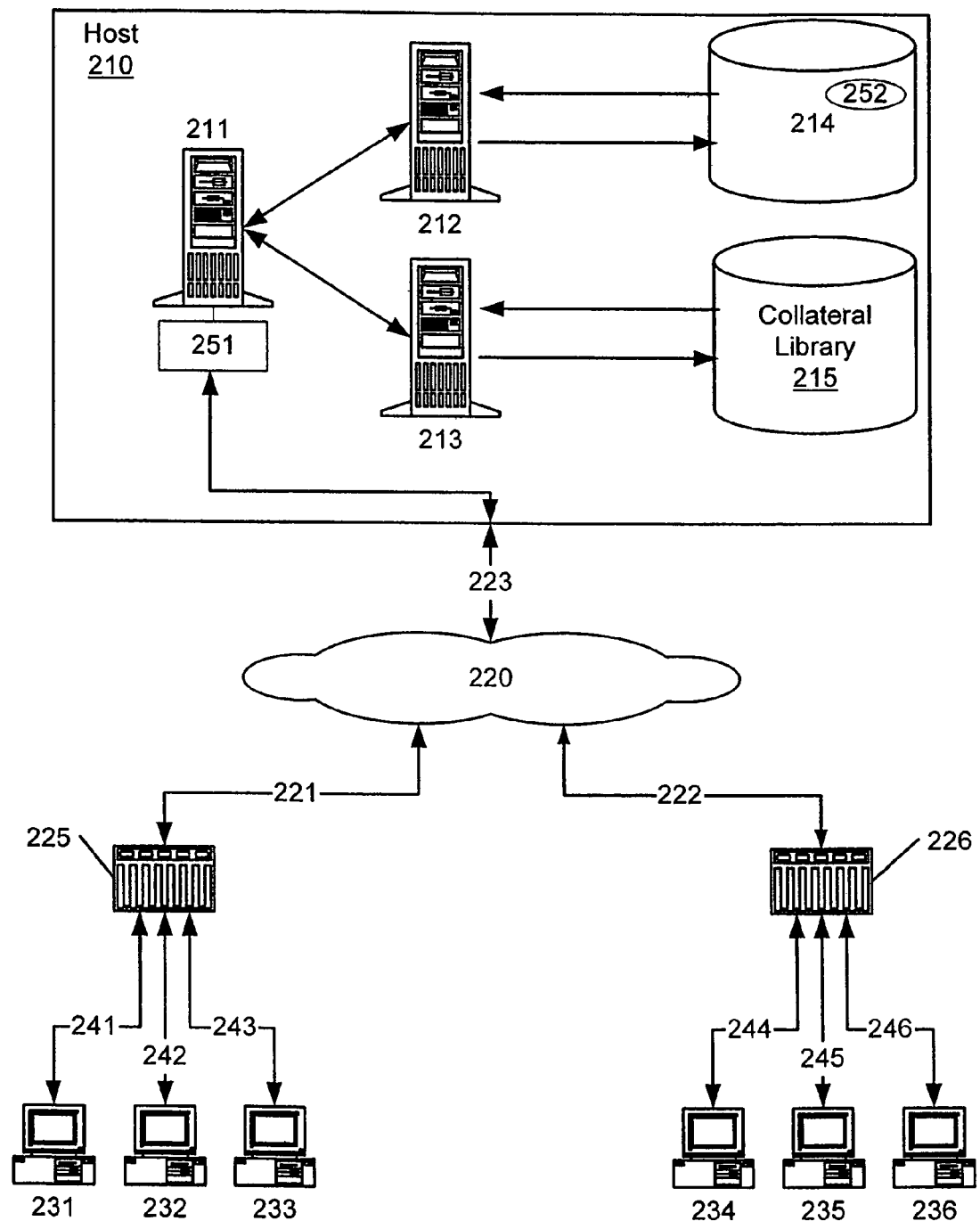
FIG. 2 is a computer network diagram.

Referring to FIG. 2, a collection of computers 100 can serve as components of a computer network. A network operating system (NOS) can also be utilized as a high level operating system. A computer network 200 can include a host computer system 210 and client computers 231-236. The client computers 231-236 can communicate with the host 210 to obtain data stored at the host 210 in databases 214-215. The client computer 231-236 may interact with the host computer 210 as if the host was a single entity in the network 200. However, the host 210 may include multiple processing and database sub-systems that can be geographically dispersed throughout the network 200.

Generally, a computer system running a boot selection software program facilitating a user's choice of high level operating system 252 is disclosed. An executable computer program code running on a computer 110, or stored on a computer readable medium 113 or 330, gives a user of the computer the ability to select an operating system from a plurality of available high level operating systems 252. Selection of an operating system 252 causes that operating system 252 to boot when the computer is restarted.

Figure 3:
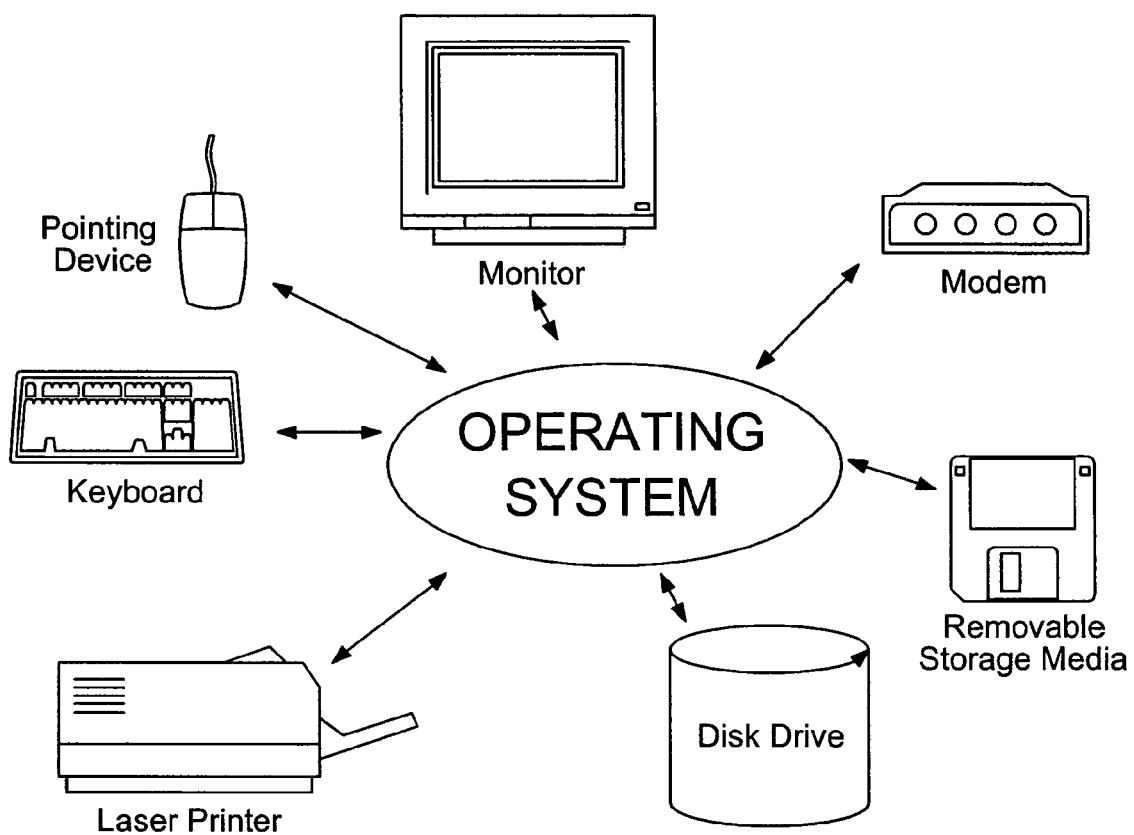
FIG. 3 illustrates the interaction of an Operating System with computer components.

Referring now to FIG. 3, a user can activate a user activatible control presented on a display 310, through use of an input device such as a keyboard 360 or a pointing device 370, associated with a computer 100. Activation of a control causes boot selection software to execute.

Normal execution of boot selection software provides a user interface 400. The user interface 400 can be any interface amenable to understanding by the user. One embodiment of a user interface comprises a list of selections that can be made by a user. Selections include various operating systems 410 that are available on the computer. An interface can include icons 510, radial buttons 420, check buttons 421, push buttons, or other well-known interface mechanisms commonly deployed in graphical user interface programs.

Figure 4:
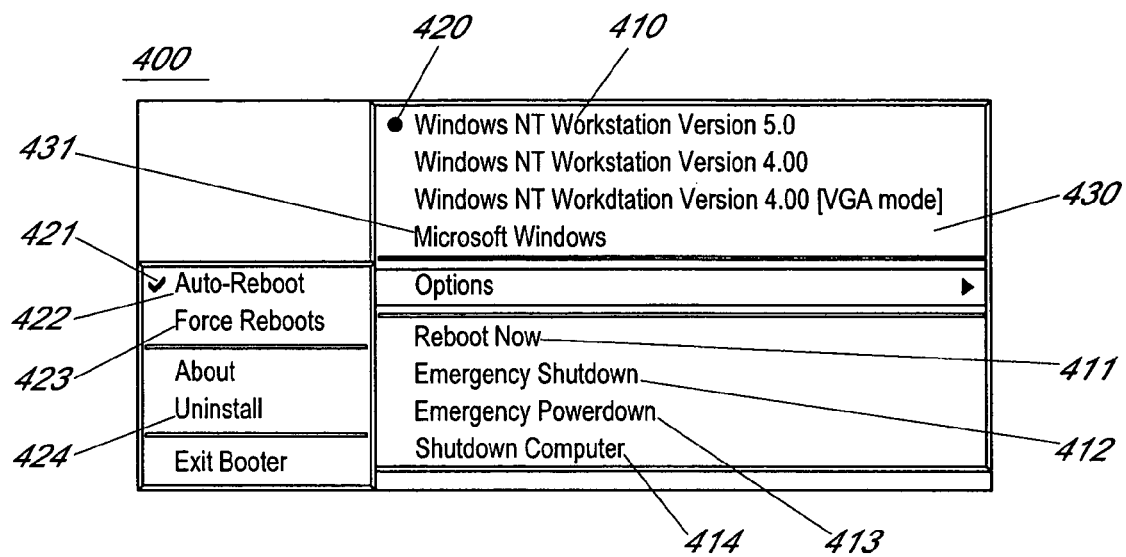
FIG. 4 illustrates one example of a user interface of this invention.
Figure 5:
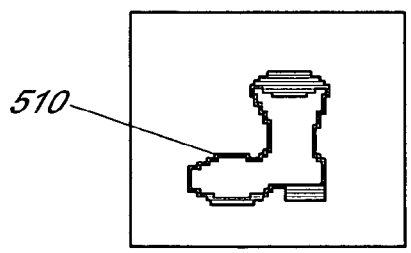
FIG. 5 illustrates a boot icon that can be used as an activatible control to execute the computer program code.

Referring to FIG. 4, the user interface 400 waits for input from a user. Using a pointing device 370 or keyboard 360 associated with the computer 100 a user can scroll through a menu 410 of available operating systems 380 presented on the interface. A user activatible control allows selection of an operating system 380 from the menu presented on the user interface 400.

Selection of an operating system 380 causes a default for a load utility in the computer 100 to be set to the operating system 380 selected from the user interface menu 410. As a result, the next time the computer is started, the default operating system for the load utility will be the operating system 380 selected from the menu 410.

One embodiment of a user activatible control suitable to start a boot selection program uses an icon symbolic of a boot 510 worn by a person. A preferred location for a boot icon would be in the lower right hand corner of a taskbar making the option available to a user at all times, even when an application program is set to be viewed at full screen mode. Additional locations for a boot icon include on a desktop, in a folder or other location accessible to a user. Other embodiments of user Interactive controls suitable to start a boot selection program comprise for example, using a keyboard mouse or other pointing device associated with the computer to click on a directory entry of the application, select an alphanumeric character corresponding to a list comprising available options, icons 510, radial buttons 420, check buttons 421, push buttons, and calling a program from a command line argument.

One embodiment of a boot selection program interface includes regions for operating systems 430 and regions for controls 431, and for other procedures 411-414 and 421-424 related to restarting the computer 100. Typical procedures can include a Reboot Now 411 procedure for causing the computer 100 to reboot and various shutdown options. An Emergency Shutdown procedure 412 of a computer can cause all open applications to end immediately without any user prompt. Typically, this is accomplished with an end task command being sent to the open application. Emergency powerdown 413 also ends all tasks and sends a power-off command to the computer but seeks confirmation first. A Shutdown Computer option 414 can follow standard procedures for powering down.

One embodiment of this invention includes the ability to set an automatic reboot if a change in operating system 380 is selected. An automatic reboot option 422 can be set from the user interface 400. A Radial button 420 or checkbox 421 can be used as typical user activatable controls for setting this option. Other known means of selection may also be used. If an automatic reboot option is selected, computer code can cause the computer to restart itself. During restart, the computer will boot the operating system 380 last selected as default.

A force reboot button 423 can cause the computer to restart when a change in operating system 380 is made. Force reboot can include the additional step of forcing any open applications to close with an end task command.

A user interface 400 for a boot selection program can also comprise activatable controls to cause the computer to uninstall 424 or reinstall executable program code relating to this invention. Reinstallation can be helpful in that an installation routine can survey the computer and determine what operating systems are available and on which partition each operating system 380 is stored.

In other embodiments a user interface 400 can offer options to configure settings associated with the boot process. These settings include, for example, the number of seconds a load utility will pause during the boot process and wait for a user to specify an operating system 380 other than a default operating system 380.

Options made via the user interface 400 cause the computer program code to modify appropriate files relating to each option. These files would include by way of example the boot.ini file and the files comprising the computer program code of this invention.

Figure 6:
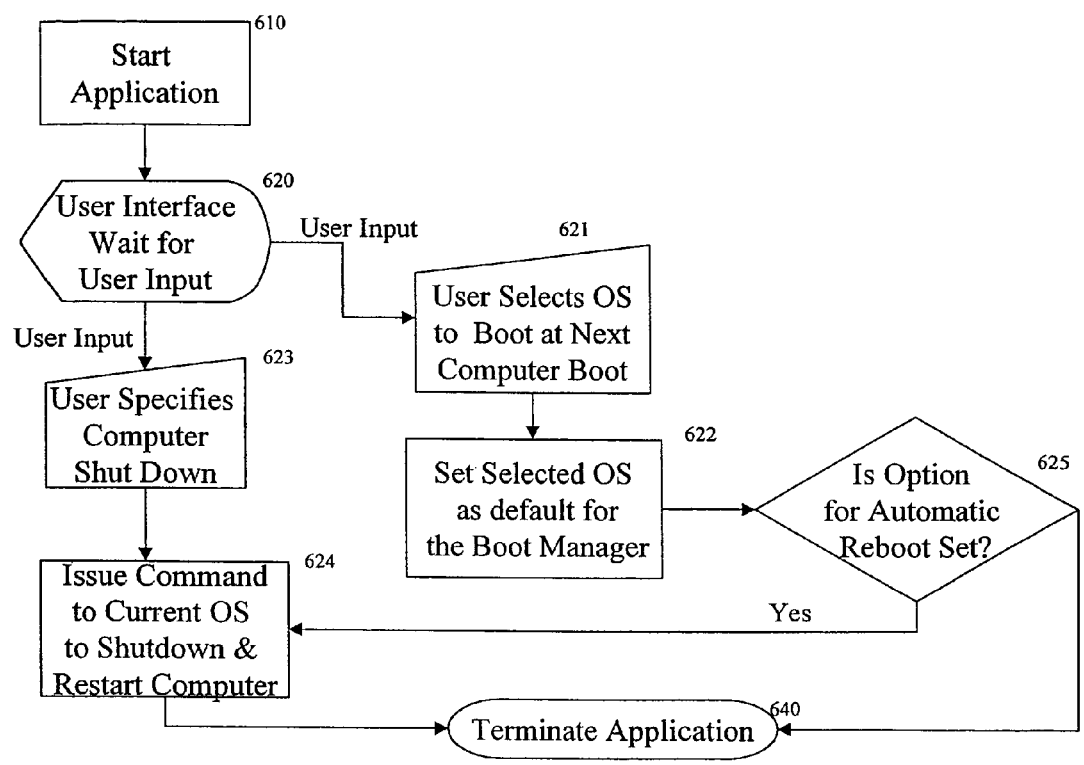
FIG. 6 shows the logic flow of an embodiment of this invention.

Referring now to FIG. 6, a logical flow for one embodiment of the invention is presented. As computer program code is started 610, a user interface can be presented on a computer screen, the user interface can wait for user input 620. A user can select an operating system to boot during the next computer boot up 621. The selected operating system can be set as the default operating system in the Boot Manager 622 of the computer. The computer code can then test to see if an option for automatic reboot is set 625.

A "yes" response to the test for an automatic reboot option can issue a command to a current operating system to shutdown and restart the computer 624. After which the application program will terminate 640.

A "no" response to the test for an automatic reboot option can proceed directly to termination of the application 640.

Many different software languages can be used to implement this invention. A preferred embodiment utilizes a compilable language such as C programming language. Other languages such as for example Delphi or Basic will also function well.

Other implementations are within the scope of the following claims.

What is claimed is:

1. A system for assisting a user in selecting an operating system for use on an electronic device, said system comprising:
   an electronic device configured to store, display, and process information under a selectable one of a plurality of operating systems; and
   program code running on said electronic device with a current operating system, the program code configured to determine one or more alternative operating systems available for subsequent boot processes, the program code further comprising:
      a control mechanism for choosing a selected alternative operating system for the next boot process wherein the selected alternative operating system is one of the plurality of alternative operating systems available for subsequent boot processes;
      an operating system indicator stored on said electronic device, wherein the operating system indicator identifies the selected alternative; and
      a time out period setting that determines a time out period occurring during the boot sequence of the selected alternative operating system, the time out period varying based on the selected alternative operating system;
      wherein the program code is configured to automatically close any open applications in response to the selection of the future operating system and wherein the program code is further configured to automatically induce the electronic device to reboot for operation under the selected alternative operating system, and
      wherein, if during the next boot process, the time out period expires without the selection of a different operating system, the program code boots the selected alternative operating system identified by the operating system indicator.

2. The system of claim 1, wherein the program code further implements a mechanism to allow a user to set a duration of time comprising a time out period during which a load utility pauses and allows a user to specify an operating system other than a default operating system.

3. The system of claim 1, wherein a change of a default operating system causes a file containing settings for a boot menu to be modified wherein the file specifies the operating system selected.

4. The system of claim 1, wherein the program code additionally comprises a mechanism for uninstalling the program code.

5. The system of claim 1, wherein the program code additionally comprises a mechanism for reinstalling the program code.

6. The system of claim 1, wherein an installation routine for installing the program code surveys the electronic device and determines the presence of operating systems available on said electronic device and the partition on which the operating system resides.

7. A method of launching an operating system of choice, comprising:
   determining alternative operating systems that are available for a subsequent boot process and on which disk partition each alternative operating system is stored;
   displaying a graphical user interface on a display, said display listing a plurality of the alternative operating systems for the next boot process;
   providing a selection mechanism for selecting an alternative operating system of choice;
   in the event the selected alternative operating system differs from a previously selected operating system, changing a time out period that occurs during the boot sequence of the selected alternative operating system;
   setting the selected alternative operating system as the default operating system for a load utility installed on an electronic device;
   automatically closing any open applications when the selected alternative operating system differs from a previously selected operating system;
   inducing a restart of the electronic device when the selected alternative operating system differs from a previously selected operating system; and
   automatically booting the selective alternative operating system, if the time out period expires during without the selection of a different operating system.

8. The method of claim 7, further comprising allowing a user to set the duration of the time out period.

9. The method of claim 7, further comprising restarting the electronic device in response to an input made via an input device calling for the electronic device to restart.

10. The method of claim 7, further comprising providing a mechanism for uninstalling program code that performs displaying, providing, selecting, and setting.

11. The method of claim 7, further comprising providing a mechanism for reinstalling program code that performs the steps of displaying, providing, selecting, and setting.

12. The method of claim 7, further comprising surveying the electronic device and determining the presence of operating systems available on said electronic device and the partition on which the operating system resides.

13. A graphical user interface for an electronic device displayed by a boot selection program for selecting an operating system, said graphical user interface comprising:
   a first display region of a graphical user interface listing a plurality of available operating systems stored on a user rewriteable storage media of the electronic device wherein the listing of the plurality of alternative operating systems for subsequent boot processes is determined by surveying where each alternative operating system is stored; and a second display region of the graphical user interface including a user activatible control to select one of the alternative operating systems, wherein a time out period is changed if the selected alternative operating system differs from a previously selected operating system, wherein open applications are automatically closed and the selected alternative operating system is automatically loaded by the electronic device when the selected alternative operating system differs from a previously selected operating system, and wherein the selected alternative operating system is automatically loaded during the boot process when the time out period expires without the selection of a different operating system.

14. The user interface of claim 13, further comprising a third display region for initiating a command to restart the electronic device, said third region including user activatible controls to specify when the electronic device restarts.

15. The user interface of claim 13, wherein the interface is displayed upon clicking an icon of a boot.

* * * * *

UNITED STATES PATENT AND TRADEMARK OFFICE
CERTIFICATE OF CORRECTION

PATENT NO. : 7,533,350 B2 Page 1 of 1
APPLICATION NO. : 10/808221
DATED : May 12, 2009
INVENTOR(S) : Vineyard, Jr. et al.

It is certified that error appears in the above-identified patent and that said Letters Patent is hereby corrected as shown below:

On the title page, item (75), "Inventors", in column 1, line 1, delete "Meridan," and insert -- Meridian, --, therefor.

In column 7, line 48, in Claim 1, delete "alternative;" and insert -- alternative operating system; --, therefor.

Signed and Sealed this

Twenty-first Day of July, 2009

JOHN DOLL
*Acting Director of the United States Patent and Trademark Office*